(12) United States Patent
Schneider

(10) Patent No.: US 8,484,614 B2
(45) Date of Patent: Jul. 9, 2013

(54) FAST LATE BINDING OF OBJECT METHODS

(75) Inventor: James Paul Schneider, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 930 days.

(21) Appl. No.: 12/475,401

(22) Filed: May 29, 2009

(65) Prior Publication Data

US 2010/0306739 A1 Dec. 2, 2010

(51) Int. Cl.
*G06F 9/44* (2006.01)

(52) U.S. Cl.
USPC .......................................................... 717/116

(58) Field of Classification Search
USPC .......................................... 717/114, 116, 117
See application file for complete search history.

(56) References Cited

U.S. PATENT DOCUMENTS

| 6,317,749 | B1* | 11/2001 | Ghatate | 1/1 |
| 6,792,462 | B2 | 9/2004 | Bernhardt et al. | |
| 7,912,869 | B1 | 3/2011 | Jas | |
| 8,027,946 | B1 | 9/2011 | Daily et al. | |
| 2002/0059260 | A1 | 5/2002 | Jas | |
| 2002/0138667 | A1 | 9/2002 | Sokolov et al. | |
| 2003/0014555 | A1* | 1/2003 | Cierniak | 709/315 |
| 2003/0105746 | A1 | 6/2003 | Stickler | |
| 2003/0112239 | A1* | 6/2003 | Shin et al. | 345/428 |
| 2004/0015855 | A1 | 1/2004 | Wallman et al. | |
| 2004/0015912 | A1* | 1/2004 | Bottomley | 717/148 |
| 2005/0010606 | A1* | 1/2005 | Kaiser et al. | 707/200 |
| 2007/0136788 | A1 | 6/2007 | Monahan et al. | |
| 2007/0192498 | A1 | 8/2007 | Dini et al. | |
| 2009/0063555 | A1 | 3/2009 | Fisher et al. | |
| 2009/0204953 | A1* | 8/2009 | Swingler et al. | 717/136 |
| 2010/0306742 | A1 | 12/2010 | Schneider | |

OTHER PUBLICATIONS

USPTO; Office Action for U.S. Appl. No. 12/475,399, mailed Oct. 23, 2012.
USPTO; Notice of Allowance for U.S. Appl. No. 12/475,399, mailed Jan. 7, 2013.
USPTO; Office Action for U.S. Appl. No. 12/475,399, mailed May 23, 2012.

* cited by examiner

*Primary Examiner* — Anna Deng
(74) *Attorney, Agent, or Firm* — Lowenstein Sandler LLP

(57) ABSTRACT

An apparatus and a method for managing class properties in a computer program is described. Classes are declared. Each class is associated with a corresponding method with at least one class inheriting one or more method corresponding to one or more other classes. A table generator forms a table of methods and references associated with each class. The table is copied forward with each inheritance declaration. A reference to a method of a class is resolved by retrieving the table associated with a current instance's class and resolving from the table associated with the class corresponding to an object from which the method is referenced.

20 Claims, 10 Drawing Sheets

| CLASS | SLOT | SIZE | OFFSET | PROPERTY |
|-------|------|------|--------|----------|
| a | 0 | 4 | 0 | p1 |

FIG. 6A

| CLASS | SLOT | SIZE | OFFSET | PROPERTY |
|-------|------|------|--------|----------|
| b | 0 | 4 | 0 | p2 |

FIG. 6B

| CLASS | SLOT | SIZE | OFFSET | PROPERTY |
|-------|------|------|--------|----------|
| a | 0 | 4 | 0 | p1 |
| c | 0 | 4 | 4 | p3 |

FIG. 6C

| CLASS | SLOT | SIZE | OFFSET | PROPERTY |
|-------|------|------|--------|----------|
| a | 0 | 4 | 0 | p1 |
| b | 0 | 4 | 4 | p2 |
| c | 0 | 4 | 8 | p3 |
| d | 0 | 4 | 12 | p4 |

FIG. 6D

| CLASS | SLOT | SIZE | OFFSET | PROPERTY |
|-------|------|------|--------|----------|
| a | 0 | 4 | 0 | p1 |

FIG. 6E

| CLASS | SLOT | SIZE | OFFSET | PROPERTY |
|-------|------|------|--------|----------|
| a | 0 | 4 | 0 | p1 |
| b | 0 | 4 | 4 | p2 |
| c | 0 | 4 | 8 | p3 |
| d | 0 | 4 | 12 | p4 |

FIG. 6F

| CLASS | SLOT | SIZE | OFFSET | PROPERTY |
|-------|------|------|--------|----------|
| a | 0 | 4 | 0 | p1 |
| b | 0 | 4 | 4 | p2 |
| c | 0 | 4 | 8 | p3 |
| d | 0 | 4 | 12 | p4 |
| e | 0 | 4 | 16 | p5 |

FIG. 6G

| SLOT | OFFSET | SIZE |
|---|---|---|
| 0 | 0 | 4 |

FIG. 8A

| CLASS | OFFSET |
|---|---|
| A | 0 |

FIG. 8B

| CLASS | OFFSET |
|---|---|
| B | 0 |
| A | 4 |
| C | 8 |

FIG. 8C

| CLASS | OFFSET |
|---|---|
| A | 0 |
| B | 4 |
| C | 8 |
| D | 12 |

FIG. 8D

| METHOD | REFERENCE |
|---|---|
| M1 | A-M1 |
| M2 | A-M2 |

FIG. 9A

| METHOD | REFERENCE |
|---|---|
| M1 | B-M1 |
| M2 | B-M2 |

FIG. 9B

| METHOD | REFERENCE |
|---|---|
| M1 | A-M1 |
| M2 | A-M2 |

FIG. 9C

| METHOD | REFERENCE |
|---|---|
| M1 | A-M1 |
| M2 | C-M2 |
| M3 | C-M3 |

FIG. 9D

| METHOD | REFERENCE |
|---|---|
| M1 | B-M1 |
| M2 | B-M2 |

FIG. 9E

| METHOD | REFERENCE |
|---|---|
| M1 | B-M1 |
| M2 | B-M2 |
| M3 | C-M3 |

FIG. 9F

| METHOD | REFERENCE |
|---|---|
| M1 | D-M1 |
| M2 | B-M2 |
| M3 | C-M3 |

FIG. 9G

| METHOD | REFERENCE |
|---|---|
| M1 | B-M1 |
| M2 | B-M2 |

FIG. 9H

| METHOD | REFERENCE |
|---|---|
| M1 | B-M1 |

FIG. 9I

FAST LATE BINDING OF OBJECT METHODS

RELATED APPLICATION

The present application is related to U.S. patent application Ser. No. 12/475,399, filed May 29, 2009, entitled "FAST LATE BINDING OF OBJECT PROPERTIES".

TECHNICAL FIELD

Embodiments of the present invention relate to computing systems, and more particularly, to class-based objects in computer programs.

BACKGROUND

In object-oriented programming, a class is a programming language construct that is used as a blueprint to create objects. This blueprint includes attributes and methods that the created objects all share. One way to form new classes (instances of which are called objects) using classes that have already been defined is to use inheritance.

The new classes, known as derived classes, take over (or inherit) attributes and behavior of the pre-existing classes, which are referred to as base classes (or ancestor classes). It is intended to help reuse existing code with little or no modification.

Multiple inheritances of properties of class-based object are challenging to manage because of their interdependencies. A simple accretive allocation strategy where each property follows the preceding property in declaration order would not work. Furthermore, looking up by property name is both slow and memory intensive.

BRIEF DESCRIPTION OF THE DRAWINGS

The present invention is illustrated by way of example, and not by way of limitation, in the figures of the accompanying drawings and in which:

FIGS. 6A-6G are examples of class table properties.

FIGS. 8A-8D are examples of another class table properties.

FIGS. 9A-9I are example of class table methods.

DETAILED DESCRIPTION

Described herein is a method and apparatus for managing class methods in a computer program. In one embodiment, classes are declared. Each class is associated with a corresponding method with at least one class inheriting one or more method corresponding to one or more other classes. A table generator forms a table of methods and references associated with each class. The table is copied forward with each inheritance declaration. A reference to a method of a class is resolved by retrieving the table associated with a current instance's class and resolving from the table associated with the class corresponding to an object from which the method is referenced.

Figure 1:
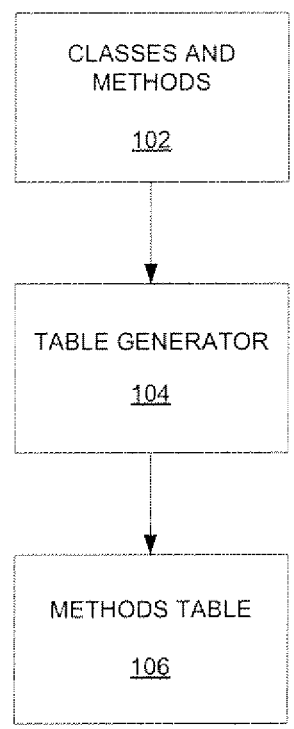
FIG. 1 is a block diagram illustrating one embodiment of a system for managing class properties of in a computer program.

FIG. 1 is a block diagram illustrating one embodiment of a system for managing class properties of in an object-oriented based computer program. Classes and properties 102 are provided to a table generator 104 that generates properties table 106.

The following is an example of class declaration in classes and properties 102:

class: a
    property: p1 ISA integer ;property
;class
class: b
    property: p2 ISA integer ;property;
;class
class: c ISA a
    property: p3 ISA integer ;property
;class
class: d ISA b ISA c
    property: p4 ISA integer ;property
;class
class: e ISA a ISA d
    property: p5 ISA integer ;property
;class The above code sample declares the classes a, b, c, d, and e, each with an explicit integer property. Classes a and b each have a single property, and inherit nothing from superclasses. Class c, however, inherits p1 from class a, class d inherits p1 from class a (via c), p2 from b, and p3 from c, and class e inherits p1 (both directly from a, and via the chain a>c>d), p2 from b via d, p3 from c via d, and p4 from d.

Table generator 104 receives the class and properties declaration 102 and builds a table of property 106. Property table includes offset descriptions when properties and superclasses are declared. In one embodiment, the table is indexed by both the property slot (or declaration index number) and the class where it was declared.

For example, using the above code sample, beginning with class a, when the property p1 is declared, the following entry gets added to the class a table (FIG. 6A):

| Class | Slot | Size | Offset | Property |
|-------|------|------|--------|----------|
| a     | 0    | 4    | 0      | p1       |

In the actual implementation, the a index would actually be the address of the class data structure, and the property name would likely not be recorded in the table. Class b (FIG. 6B) would be similar:

| Class | Slot | Size | Offset | Property |
|-------|------|------|--------|----------|
| b     | 0    | 4    | 0      | p2       |

The table for class c (FIG. 6C) would first be initialized by copying the entries from the table for class a (from the "ISA a" declaration). Then, an entry for p3 would be added. This would result in the following table:

| Class | Slot | Size | Offset | Property |
|-------|------|------|--------|----------|
| a     | 0    | 4    | 0      | p1       |
| c     | 0    | 4    | 4      | p3       |

For class d (FIG. 6D), first the entries for class b are copied, then the entries for class c, then a new entry for the property p4 gets added:

| Class | Slot | Size | Offset | Property |
|-------|------|------|--------|----------|
| b     | 0    | 4    | 0      | p2       |
| a     | 0    | 4    | 4      | p1       |
| c     | 0    | 4    | 8      | p3       |
| d     | 0    | 4    | 12     | p4       |

For class e (FIG. 6E), the table building process is complicated by the fact that the class inherits from class a through two different paths—both directly from the class itself, and via class d.

This type of inheritance pattern may show up in cases where references to inherited properties are resolved in a depth first left to right traversal of the inheritance tree, and it would be more appropriate to use methods from class a, rather than a subclass. For example, if class a has a method that is overridden in class c, but class d needs to use the class a method, this would be the appropriate inheritance ordering. Other inheritance resolution methods would lead to different cases where this kind of inheritance tree was appropriate.

Building the table for properties in class e (FIG. 6E) would proceed in steps. First, the entries from the table for class a would be copied:

| Class | Slot | Size | Offset | Property |
|-------|------|------|--------|----------|
| a     | 0    | 4    | 0      | p1       |

Next, the entries for class d would be copied. However, the entries describing class a would be skipped (since they're already in the table):

| Class | Slot | Size | Offset | Property |
|-------|------|------|--------|----------|
| a     | 0    | 4    | 0      | p1       |
| b     | 0    | 4    | 4      | p2       |
| c     | 0    | 4    | 8      | p3       |
| d     | 0    | 4    | 12     | p4       |

Finally, the entry for p5 is added to the table:

| Class | Slot | Size | Offset | Property |
|-------|------|------|--------|----------|
| a     | 0    | 4    | 0      | p1       |
| b     | 0    | 4    | 4      | p2       |
| c     | 0    | 4"   | 8      | p3       |
| d     | 0    | 4    | 12     | p4       |
| e     | 0    | 4    | 16     | p5       |

Figure 2:
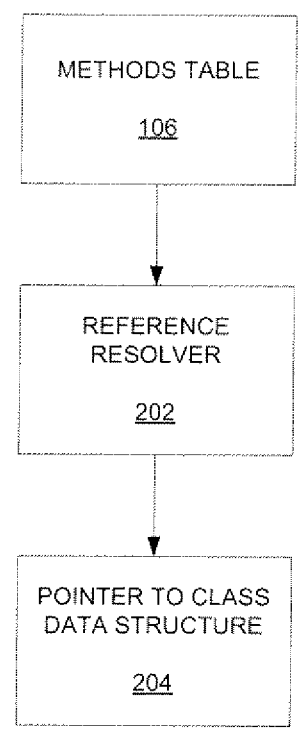
FIG. 2 is a block diagram illustrating one embodiment of a system for resolving class properties in a computer program.

FIG. 2 is a block diagram illustrating one embodiment of a system for resolving class properties in a computer program.

Properties table 106 is provided to property reference resolver 202 to generate a pointer to class data structure 204.

References to properties would be resolved by recording the class and slot number of the property where it occurs in code, and then resolving from the table associated with the class corresponding to the object from which the property is referenced.

For example, a method in class c references the p3 property, and an instance of class e is used to call that method. Resolving the property reference in the method would follow these steps:

(1) the method would look up the table corresponding to the current instance's class type (the table for class e).

(2) the method would look for the entry corresponding to class c, slot 0, obtaining an offset of 8, a size of 4.

(3) the method would add the offset to the base of storage for the current instance.

(4) the method would use the pointer it created in step #3 to reference the property.

The class reference in the table could be a pointer to the class data structure(s) that define an underlying class. In another embodiment, superclasses could be enumerated in the subclass, and the class reference could be the enumeration index of the classes themselves. This adds a layer of indirection to the class structures, but is potentially more compact than using pointers, since it's unlikely that any class will inherit (directly or indirectly) from more than a few dozen classes. This means the enumeration index key could be stored in a single byte. If the number of properties is limited to no more than 256 per class, this index would also be a single byte.

By using enumerated superclasses and limiting classes to no more than 256 properties, the property resolution process could construct offsets into tables of no more than 65,536 entries, so the search for a property offset becomes a search for a class enumeration index followed by a table lookup.

In yet another embodiment, the result of looking up the superclass within a class could be a pointer to a table of property offsets that would be indexed by the slot number of the property.

Figure 3:
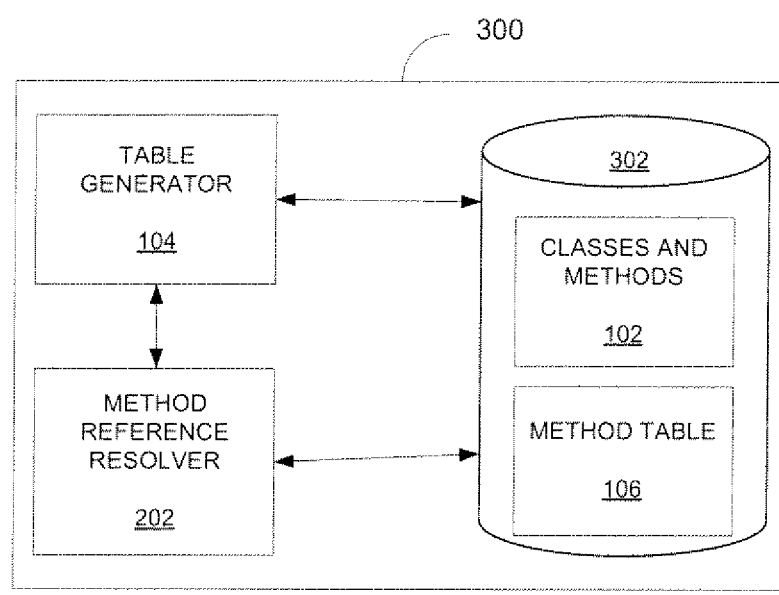
FIG. 3 is a block diagram illustrating one embodiment of a computer system for managing and resolving class properties.

FIG. 3 is a block diagram illustrating one embodiment of a computer system 300 for managing and resolving class properties/methods. Computer system 300 includes a table generator 104, a property/method reference resolver 202, and a storage device 302.

Table generator 104 is configured to receive a declaration of classes and properties/methods 102 where each class is associated with a corresponding property/method. At least one class inherits one or more property/method corresponding to one or more other classes. Table generator 104 forms a table of property/method offsets associated with each class. The table is copied forward with each inheritance declaration.

Property reference resolver 202 resolves a reference to a property/method of a class by retrieving the table associated with a current instance's class and resolving from the table associated with the class corresponding to an object from which the property/method is referenced.

In one embodiment, property/method reference resolver 202 consults the table corresponding to the current instance's class, searches for an offset entry and a size entry corresponding to a referenced class, and add the offset entry to a base of storage for the current instance's class. Property reference resolver 202 also generates a pointer with the added offset entry to the base of storage to reference to the property/method corresponding to the referenced class.

Storage device 302 stores the properties/methods and classes declaration 102, and property/method table 106.

Figure 4:
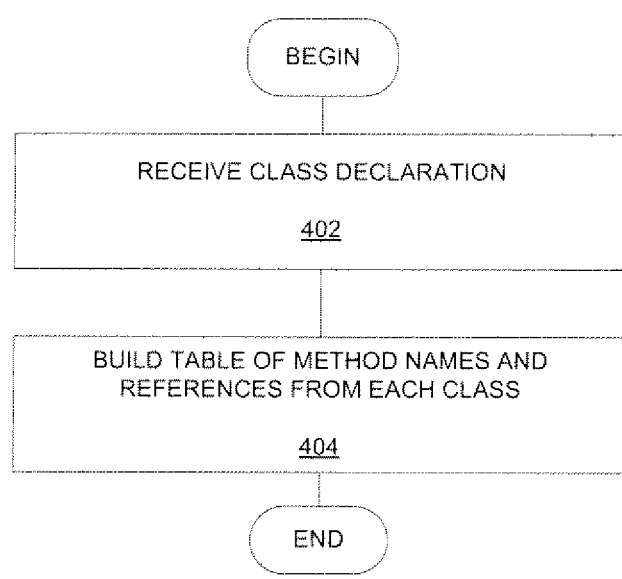
FIG. 4 is a flow diagram illustrating one embodiment of a method for managing class properties and methods.

FIG. 4 is a flow diagram illustrating one embodiment of a method for managing class properties/methods. At 402, a class declaration is received. At 404, a table of property/method with offset description is built for each class.

Figure 5:
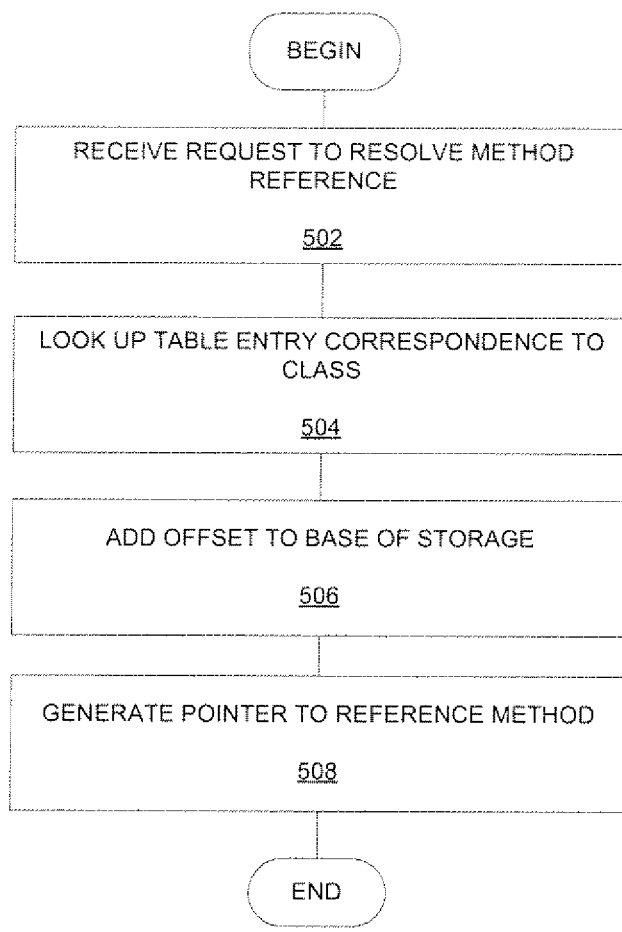
FIG. 5 is a flow diagram illustrating one embodiment of a method for resolving class properties and methods.

FIG. 5 is a flow diagram illustrating one embodiment of a method for resolving class properties/methods. At 502, a request to resolve property/method reference is received. At 504, the table corresponding to the current instance's class is looked up to search for an offset entry and a size entry corresponding to a referenced class. At 506, the offset entry is added to a base of storage for the current instance's class. At 508, a pointer with the added offset entry to the base of storage to reference to the property/method corresponding to the referenced class is generated.

Figure 7:
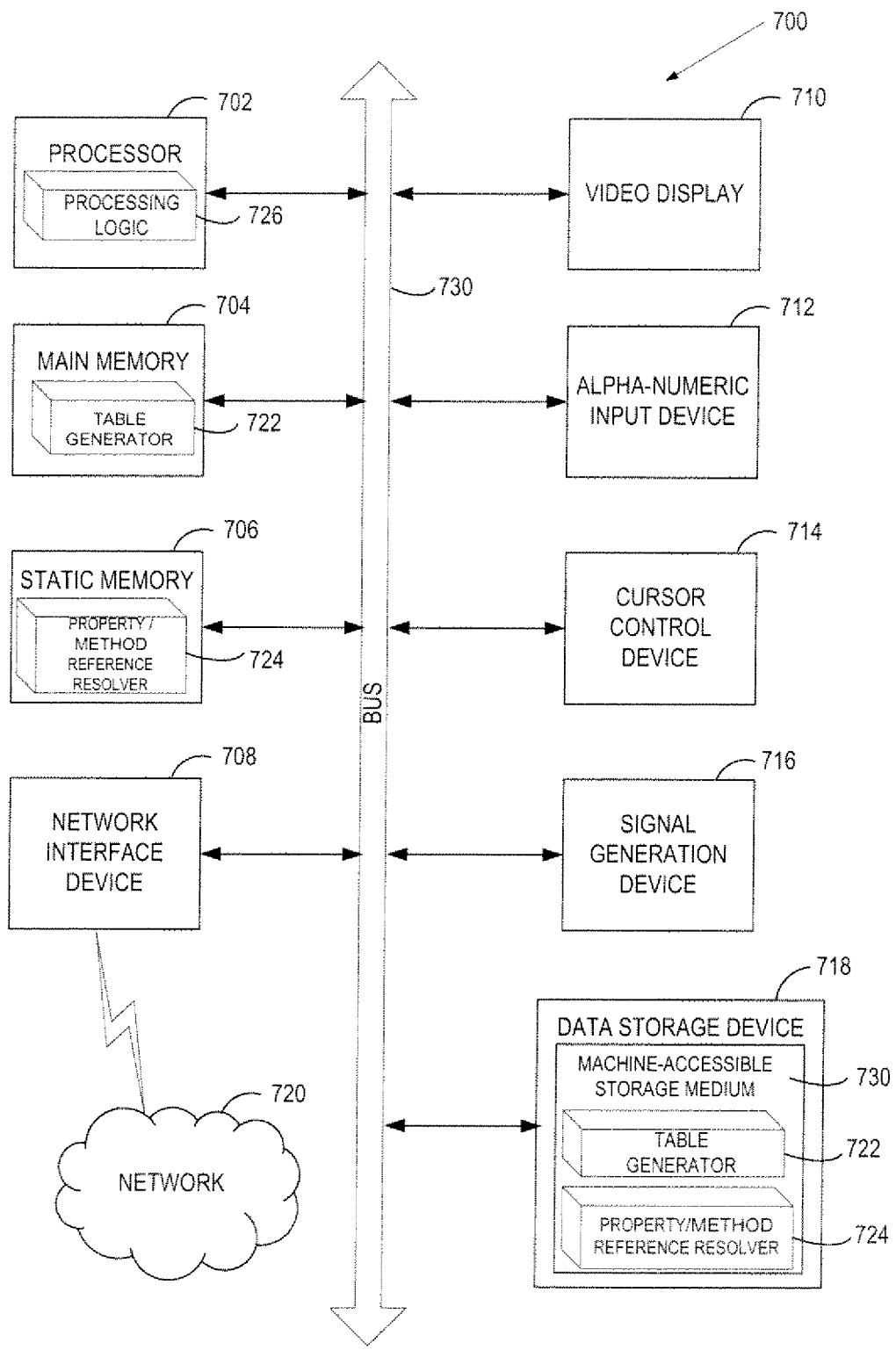
FIG. 7 is a block diagram illustrating an example of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute modules processing logic 726 for performing the operations and steps discussed herein with. In one embodiment, the modules may include hardware or software or a combination of both. In another embodiment, processing device 702 includes a pure function identifier module 728.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-accessible storage medium 730 on which is stored one or more sets of instructions (e.g., table generator software 722) embodying any one or more of the methodologies or functions described herein. The software 722 may also reside, completely or at least partially, within the main memory 704 and/or within the processing device 702 during execution thereof by the computer system 700, the main memory 704 and the processing device 702 also constituting computer-accessible storage media. The software 722 may further be transmitted or received over a network 720 via the network interface device 708.

The computer-accessible storage medium 730 may also be used to store table generator 722 and method reference resolver 724 as presently described. Table generator 722 and method reference resolver 724 may also be stored in other sections of computer system 700, such as static memory 706.

While the computer-accessible storage medium 730 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In accordance with another embodiment, instead of having an explicit table of all properties and offsets as previously described, each class would manage its own properties table, and a table of its superclasses.

In the class properties table, the offset and size of each property is recorded. In the superclasses table, the offset within the object to reach the beginning of the storage reserved for that class' properties is recorded.

Following the example previously illustrated, each of the classes would have a property table (FIG. 8A) that contains a single record that looks like this:

| Slot | Offset | Size |
|------|--------|------|
| 0    | 0      | 4    |

Since a and b have no superclasses, their superclasses tables would be empty. Class c would have a superclasses table (FIG. 8B) that looks like this:

| Class | Offset |
|-------|--------|
| a     | 0      |

Class d would have a superclasses table (FIG. 8C) that looks like this:

| Class | Offset |
|-------|--------|
| b     | 0      |
| a     | 4      |
| c     | 8      |

Class e would have a superclass table (FIG. 8D) that looks like this:

| Class | Offset |
|---|---|
| a | 0 |
| b | 4 |
| c | 8 |
| d | 12 |

The classes would either need to keep track of the total size of storage dedicated to superclasses, or they could add themselves to the end of the superclasses table.

Resolving a property reference would require a couple levels of indirection. First, the superclasses table for the current object's class would be searched for the class where the corresponding property was declared, and the offset recorded for that class would be added to the base address for the object. Next, the appropriate class properties table would be indexed by the property slot number, and the offset for that property would be added to the address calculated previously.

If all of the properties are constrained to be the same size, or if the system does not care about bounds checking, the offset of the property would suffice, in which case the classes do not even need to maintain the table of properties—the property reference is recorded within the method as a reference to the declaring class, and an offset.

The above technique is not only applicable to class properties but also to class methods. Again, each class has an associated table, but this one is methods, rather than properties. Associated with each method is its name and a reference to the code that makes up the method itself.

Entries in this table would be copied forward from superclasses to subclasses, with individual methods being skipped if they appear in the table already. Then, as methods are declared within the class itself, they replace entries if necessary. This enforces depth-first left to right inheritance automatically.

For example, consider the following class and method definitions:

```
class: a
    method: m1 ;method
    method: m2 ;method
;class
class: b
    method: m1 ;method
    method: m2 ;method
;class
class: c ISA a
    method: m2 ;method
    method: m3 ;method
;class
class: d ISA b ISA c
    method: m1 ;method
    ;class
class: e ISA b ISA d
;class
```

In this example, the method tables for classes a and b would be similar—the only difference would be the reference to the method code. The table for class a (FIG. 9A) would be:

| Method | Reference |
|---|---|
| m1 | a-m1 |
| m2 | a-m2 |

For class b, the table (FIG. 9B) would be:

| Method | Reference |
|---|---|
| m1 | b-m1 |
| m2 | b-m2 |

With the class c, the situation becomes a bit more complex. At the point where a is declared a superclass of class c, the table (FIG. 9C) gets copied forward:

| Method | Reference |
|---|---|
| m1 | a-m1 |
| m2 | a-m2 |

Next, when methods m and m3 are declared in class c, the table (FIG. 9D) gets updated like this:

| Method | Reference |
|---|---|
| m1 | a-m1 |
| m2 | c-m2 |
| m3 | c-m3 |

Class d is a bit more complex—first, the table (FIG. 9E) for class b gets copied:

| Method | Reference |
|---|---|
| m1 | b-m1 |
| m2 | b-m2 |

Next, the entries for class c get copied forward, if they don't already exist. Due to the preexisting entries, only m3 gets copied forward (FIG. 9F):

| Method | Reference |
|---|---|
| m1 | b-m1 |
| m2 | b-m2 |
| m3 | c-m3 |

Finally, the declaration of m1 overrides the m1 declaration in the table (FIG. 9G):

| Method | Reference |
|---|---|
| m1 | d-m1 |
| m2 | b-m2 |
| m3 | c-m3 |

For class e, first, the table (FIG. 9H) for class b is copied forward:

| Method | Reference |
|---|---|
| m1 | b-m1 |
| m2 | b-m2 |

Next, the entries for class d that do not appear in the table (FIG. 9I) are copied forward:

| Method | Reference |
|---|---|
| m1 | b-m1 |
| m2 | b-m2 |
| m3 | c-m3 |

To resolve a method, the method is looked up by name from the table maintained in the class associated with the current object instance. For example, an object of class e calling method m1 will get the method referenced as b-m1. This would be true, even if the object were referenced by a variable typed to class d (as long as the method binding were deferred to runtime, and used the object's class pointer, rather than the variable's).

The following should be noted:

If the language supports method overloading by type, the method name would need to be augmented by the types of the arguments to the method (and possibly the expected return type of the method).

While the above illustrated tables are linear and contiguous tables, the tables would most likely be stored in a more complicated data structure (such as a hash table or binary tree) to facilitate searches.

If the product of the number of distinct method names/signatures and distinct classes is small, method lookups by name can be replaced with table indexing—create a table of all of the method names during compile time, and each class gets an array of method references for the corresponding method name/signature. This can be extended to support separate compilation by including the table of method names for a particular unit of compilation and a table of method references within the compiled class or object code. The linker would then be responsible for combining the tables.

An alternative technique that may be simpler to implement (at the cost of additional memory and time) would be to collect all of the superclass declarations and process them in reverse order. Where the language syntax requires that all superclasses be declared at the same time a subclass is declared, this only requires enough extra storage to hold the class names. In this case, processing the superclasses in reverse order, every occurrence of a method name evicts whatever is already in the table.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   declaring a plurality of classes for a computer program to be executed by a processing device, each class associated with a plurality of corresponding class methods, a first class inheriting one or more class methods corresponding to a second class based on an inheritance declaration;

for each class of the plurality of classes, forming, by a table generator executed by the processing device, a table of the plurality of corresponding class methods for the each class of the plurality of classes and references associated with the each class of the plurality of classes, wherein a table associated with the second class is copied forward to a table associated with the first class based on the inheritance declaration, wherein the table associated with the first class comprises a method reference of the table associated with the second class as a result of the table associated with the second class being copied forward to the table associated with the first class; and resolving, by a reference resolver executed by the processing device, a reference to a class method, wherein the class method is referenced by the second class and wherein the class method is called by the first class by:

retrieving the table associated with the first class, and accessing, from the table associated with the first class, an entry corresponding to the second class.

2. The method of claim 1 further comprising:
consulting the table corresponding to the first class; and searching the table by class method name.

3. The method of claim 1, wherein the reference includes a pointer to the class method of the second class.

4. The method of claim 1, wherein a superclass is enumerated in a subclass, the reference including an enumeration index of a subclass, the enumeration index stored in one byte.

5. The method of claim 1 further comprising:
generating a table of class method names and class method references within a compiled class or object code for each unit of compilation; and
combining the tables.

6. The method of claim 1 further comprising:
generating a table of all of the class method names during a compile time; and
assigning each class with an array of class method references for the corresponding class method name.

7. The method of claim 1 further comprising:
collecting a plurality of superclass declarations in a first order; and
processing the plurality of superclass declarations in a reverse order from the first order.

8. A non-transitory computer-readable storage medium, having instructions stored therein, which when executed, cause a processing device to perform operations comprising:

declaring a plurality of classes for a computer program to be executed by the processing device, each class associated with a plurality of corresponding class methods, a first class inheriting one or more class methods corresponding to a second class based on an inheritance declaration;

for each class of the plurality of classes, forming a table of the plurality of corresponding class methods for the each class of the plurality of classes and references associated with the each class of the plurality of classes, wherein a table associated with the second class is copied forward to a table associated with the first class based on the inheritance declaration, wherein the table associated with the first class comprises a method reference of the table associated with the second class as a result of the table associated with the second class being copied forward to the table associated with the first class; and resolving a reference to a class method, wherein the class method is referenced by the second class and wherein the class method is called by the first class by:

retrieving the table associated with a the first class, and accessing, from the table associated with the first class, an entry corresponding to the second class.

9. The non-transitory computer-readable storage medium of claim 8, wherein the operations further comprise:
consulting the table corresponding to the first class; and searching the table by class method name.

10. The non-transitory computer-readable storage medium of claim 8 wherein the reference includes a pointer to the class method of the second class.

11. The non-transitory computer-readable storage medium of claim 8 wherein a superclass is enumerated in a subclass, the reference including an enumeration index of a subclass, the enumeration index stored in one byte.

12. The non-transitory computer-readable storage medium of claim 8 wherein the operations further comprise:
generating a table of class method names and class method references within a compiled class or object code for each unit of compilation; and
combining the tables.

13. The non-transitory computer-readable storage medium of claim 8 wherein the operations further comprise:
forming a table of all of the class method names during a compile time; and
assigning each class with an array of class method references for the corresponding class method name.

14. The non-transitory computer-readable storage medium of claim 8 wherein the method further comprises:
collecting a plurality of superclass declarations in a first order; and
processing the plurality of superclass declarations in a reverse order from the first order.

15. A computer system comprising:
a table generator configured to declare a plurality of classes, the plurality of classes to be executed by a processing device, each class associated with a plurality of corresponding class methods, a first class inheriting one or more class methods corresponding to a second class based on an inheritance declaration, and for each class of the plurality of classes, to form a table of the plurality of corresponding class methods for the each class of the plurality of classes and references associated with the each class of the plurality of classes, wherein a table associated with the second class is copied forward to a table associated with the first class based on the inheritance declaration, wherein the table associated with the first class comprises a method reference of the table associated with the second class as a result of the table associated with the second class being copied forward to the table associated with the first class; and a reference resolver coupled to the table generator, the reference resolver configured to resolve a reference to a class method, wherein the class method is referenced by the second class and wherein the class method is called by the first class by retrieving the table associated with the first class and accessing, from the table associated with the first class, an entry corresponding to the second class.

16. The computer system of claim 15 wherein the reference resolver is configured to consult the table corresponding to the first class, and to search the table by class method name.

17. The computer system of claim 15, wherein the reference includes a pointer to the class method of the second class, a superclass enumerated in a subclass, the reference including an enumeration index of a subclass, the enumeration index stored in one byte.

18. The computer system of claim 15 further comprising:
the table generator configured to generate a table of class method names and class method references within a compiled class or object code for each unit of compilation; and
a linker coupled to the table generator, the linker configured to combine the tables.

19. The computer system of claim 15 wherein the table generator is configured to form a table of all of the class method names during a compile time, and to assign each class with an array of class method references for the corresponding class method name.

20. The computer system of claim 15 wherein the table generator is configured to collect a plurality of superclass declarations in a first order, and to process the plurality of superclass declarations in a reverse order from the first order.

* * * * *